United States Patent
Baekby Bjarnoe et al.

(10) Patent No.: US 12,000,361 B2
(45) Date of Patent: Jun. 4, 2024

(54) ROCKET PROPELLANT TANK ARRANGEMENT, ROCKET PROPULSION UNIT, AND ROCKET

(71) Applicant: Orbital Express Launch Limited, London (GB)

(72) Inventors: Jonas Baekby Bjarnoe, Bagsvaerd (DK); Kristian Von Bengtson, Copenhagen K (DK)

(73) Assignee: Orbital Express Launch Limited, London (GB)

( * ) Notice: Subject to any disclaimer, the term of this patent is extended or adjusted under 35 U.S.C. 154(b) by 468 days.

(21) Appl. No.: 16/477,839

(22) PCT Filed: Jan. 11, 2018

(86) PCT No.: PCT/EP2018/050669
§ 371 (c)(1),
(2) Date: Jul. 12, 2019

(87) PCT Pub. No.: WO2018/130616
PCT Pub. Date: Jul. 19, 2018

(65) Prior Publication Data
US 2019/0360431 A1    Nov. 28, 2019

(30) Foreign Application Priority Data
Jan. 13, 2017   (EP) ..................................... 17151435

(51) Int. Cl.
*F02K 9/60*   (2006.01)
*B64G 1/40*   (2006.01)

(52) U.S. Cl.
CPC .............. *F02K 9/605* (2013.01); *B64G 1/402* (2013.01); *F05D 2250/231* (2013.01); *F05D 2250/36* (2013.01); *F17C 2270/0194* (2013.01)

(58) Field of Classification Search
CPC ................................ B64G 1/402; F02K 9/605
See application file for complete search history.

(56) References Cited

U.S. PATENT DOCUMENTS

| | | | | |
|---|---|---|---|---|
| 2,902,822 A | * | 9/1959 | McKiernan | F02K 9/605 60/39.48 |
| 3,282,748 A | * | 11/1966 | Martens | C21D 7/02 228/155 |
| 3,697,021 A | * | 10/1972 | Howard | F17C 13/12 244/172.2 |
| 4,723,736 A | * | 2/1988 | Rider | F02K 9/605 244/171.1 |

(Continued)

FOREIGN PATENT DOCUMENTS

GB    2264684 A    9/1993
WO    WO2013158195 A2    10/2013

OTHER PUBLICATIONS

Knauer, C. D. et al., Design and Fabrication Techniques for a Large Titanium 15-3-3-3 Propellant Tank, Journal of Propulsion and Power, 1993, 161-162, vol. 9, No. 2.

*Primary Examiner* — Kyle Robert Thomas
(74) *Attorney, Agent, or Firm* — Wiggin and Dana LLP

(57) ABSTRACT

A rocket propellant tank arrangement (40) for storing fuel and oxidizer for launching a rocket includes an oxygen tank (42) for storing liquid oxygen and a fuel tank (52) for storing liquid fuel, wherein the fuel tank is at least partially arranged within the oxygen tank.

15 Claims, 5 Drawing Sheets

(56) References Cited

U.S. PATENT DOCUMENTS

| | | | | |
|---|---|---|---|---|
| 4,807,833 | A * | 2/1989 | Pori | B64G 1/12 |
| | | | | 220/560.1 |
| 5,568,901 | A * | 10/1996 | Stiennon | B64G 1/002 |
| | | | | 244/171.3 |
| 7,093,337 | B1 * | 8/2006 | Taylor | B64G 1/402 |
| | | | | 220/4.14 |
| 7,568,352 | B2 * | 8/2009 | Grayson | F17C 3/10 |
| | | | | 62/45.1 |
| 7,658,300 | B2 * | 2/2010 | Eckert | F17C 1/14 |
| | | | | 220/567.3 |
| 2007/0193282 | A1 * | 8/2007 | Grayson | F17C 3/10 |
| | | | | 62/48.3 |
| 2012/0205493 | A1 * | 8/2012 | Robinson | B64C 1/10 |
| | | | | 244/172.2 |
| 2015/0027102 | A1 * | 1/2015 | Bahn | F02K 9/46 |
| | | | | 60/258 |

* cited by examiner

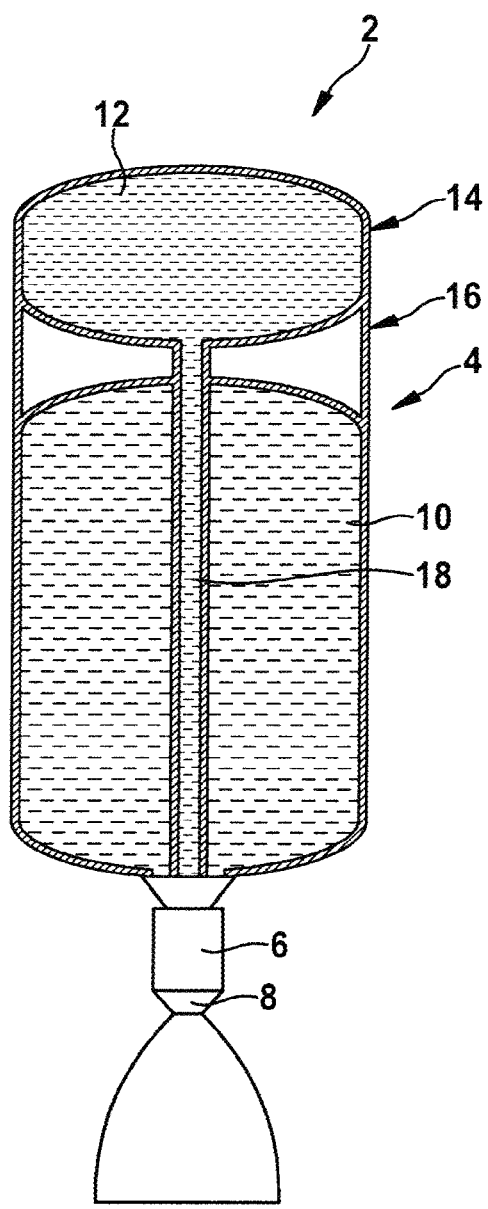
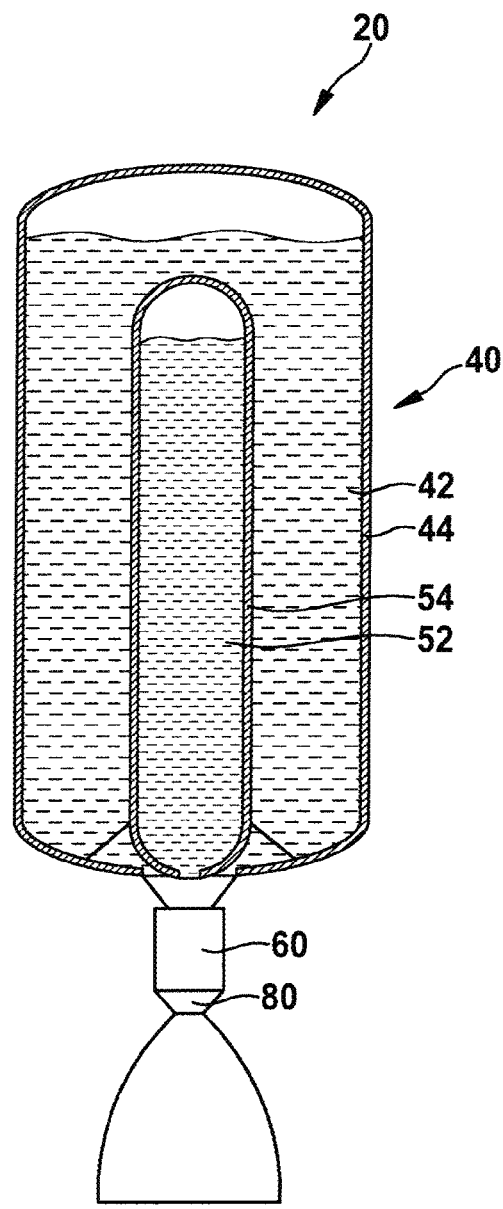
PRIOR ART
Fig. 1
Fig. 2

ROCKET PROPELLANT TANK ARRANGEMENT, ROCKET PROPULSION UNIT, AND ROCKET

The present invention is in the field of rockets for launching objects, such as satellites, into space. In particular, the present invention is in the field of fuel tanks for such rockets.

Various types of rockets are employed for launching objects into space. For example, various approaches are undertaken to make the launching of satellites into space more readily accessible. Irrespective of the kinds of objects to be launched, rockets have to deal with the issue that the structure and the fuel required for launching the rocket are very heavy compared to the object to be launched into space, commonly referred to as payload in terms of the rocket dynamics. Despite extensive efforts of increasing the efficiency of rockets in terms of minimizing the amount of fuel needed for a particular payload, the energy efficiency of state of the art rockets is still not satisfactory.

Accordingly, it would be beneficial to modify existing rocket designs for an increase in energy efficiency.

Exemplary embodiments of the invention include a rocket propellant tank arrangement for storing fuel and oxidizer for launching a rocket, the rocket propellant tank arrangement comprising an oxygen tank for storing liquid oxygen and a fuel tank for storing liquid fuel, wherein the fuel tank is at least partially arranged within the oxygen tank.

Exemplary embodiments of the invention allow for a rocket propellant tank arrangement that is able to store highly energetic propellants, while having a low structural mass and thus contributing to a high energy efficiency of the overall rocket. The arrangement of the fuel tank at least partially within the oxygen tank allows for a particularly light weight construction of the rocket propellant tank arrangement, thus greatly contributing to the overall energy efficiency of a rocket equipped with the rocket propellant tank arrangement. It is possible to select the fuel for a particular rocket and the temperatures/pressures for the liquid fuel and the liquid oxygen in a way that the structural burden on the separation between the fuel tank and the oxygen tank is low. Also, the requirements in terms of insulation may be low. The separation between the fuel tank and the oxygen tank may thus add much less weight to the overall structural mass of the rocket than the components required for supporting separate tanks that are surrounded by the outside environment. Accordingly, as compared to prior approaches, where a fuel tank and an oxidizer tank were stacked in a one above the other relationship, an equivalent amount of propellants can be stored with a considerably lower structural mass.

According to a further embodiment, the fuel tank is one of a propane tank for storing liquid propane, a propene tank for storing liquid propene, and a propylene tank for storing liquid propylene. In particular, the combination of liquid oxygen and liquid propane allows for an energetically beneficial propulsion of a rocket. At the same time, the arrangement of a propane tank at least partially within the oxygen tank allows for a particularly light weight construction of the rocket propellant tank arrangement. The separation between the oxygen tank and the propane tank does not require excessive mechanical strength and does not require excessive thermal insulation, because liquid oxygen and liquid propane can be stored at similar temperatures and similar pressures. Without burdensome requirements in terms of mechanical strength and insulation, the separation between the oxygen tank and the propane tank can be implemented in a fairly basic manner and does not add much weight to the overall weight of the rocket. In addition, the arrangement of the propane tank at least partially within the oxygen tank allows for a mutual cooling of the liquid oxygen and the liquid propane. Also, the similar pressures within the propane tank and the oxygen tank allow for the separation between the two tanks to be a mere mechanical barrier that prevents diffusion therethrough from any of the two components, without requiring large mechanical strength in terms of pressure gradients. The propane tank does not have to be designed for being surrounded by the outside environment. Analogous considerations apply to the combination of liquid propene and liquid oxygen as well as to the combination of liquid propylene and liquid oxygen.

According to a further embodiment, the rocket propellant tank arrangement comprises a fuel tank wall, which forms the fuel tank for storing liquid fuel. With the fuel tank being at least partially arranged within the oxygen tank, the fuel tank wall can form an effective border towards the oxygen tank at low structural mass for the reasons laid out above. The expression forming the fuel tank does not require the fuel tank wall to form an entirely enclosed space. For example, the fuel tank wall may be a cylindrical wall, with the fuel tank being closed by fuel tank caps.

According to a further embodiment, the rocket propellant tank arrangement comprises an oxygen tank wall, arranged at least partially around the fuel tank wall, with the fuel tank wall and the oxygen tank wall forming the oxygen tank for storing liquid oxygen between the fuel tank wall and the oxygen tank wall. In this way, the fuel tank wall forms both the surrounding wall around the fuel tank as well as an inner wall of the oxygen tank. In this way, liquid fuel and liquid oxygen are stored adjacent to each other, with only the fuel tank wall separating the two volumes for storing fuel and oxidizer. Again, the oxygen tank may be closed by oxygen tank caps, provided in addition to the oxygen tank wall.

According to a further embodiment, a plurality of fuel tank fixation elements are arranged between the fuel tank wall and the oxygen tank wall. In this way, a positional fixation of the fuel tank within the oxygen tank can be achieved with low complexity. As the temperature and pressure gradients between the oxygen tank and the fuel tank are small, the fuel tank fixation elements can have a low structural mass and do not have to be load bearing.

In a particular embodiment, the plurality of fuel tank fixation elements may be a plurality of fixation fins. The fixation fins may be sheet-like elements extending between the fuel tank wall and the oxygen tank wall.

In a further particular embodiment, the plurality of fuel tank fixation elements may be a plurality of slosh baffles. In this way, the fuel tank fixation elements may on the one hand provide a positional fixation of the fuel tank within the oxygen tank, while at the same time reducing or eliminating undesired dynamic effects from the liquid oxygen moving within the oxygen tank. The slosh baffles may also have the form of fixation fins.

According to a further embodiment, the fuel tank wall is made of aluminium, steel, in particular austenitic stainless steel, carbon fiber based composites or composite overwrap aluminium. The latter material is aluminium, wrapped or coated with composite material, such as carbon fiber based composites. Aluminium, composite materials and composite overwrap aluminium are particularly light materials. The fuel tank wall may also be a mixture of two or more of the above material.

The fuel tank may also be of one or more of above materials in combination with one or more other materials.

According to a further embodiment, the fuel tank wall is made from aluminium and/or the oxygen tank wall is made from composite overwrap aluminium. It is also possible that the fuel tank consists essentially of aluminium.

According to a further embodiment, the fuel tank wall is free of insulating material. In this way, the structural mass, spent on insulating the fuel tank in prior art approaches, can be eliminated, thus increasing the overall energy efficiency of the rocket. Further, with the fuel tank being at least partially arranged within the oxygen tank, the lack of insulating material in fact allows for a beneficial mutual cooling of the liquid oxygen and the liquid fuel.

According to a further embodiment, the fuel tank wall has a thickness of between 0.1 mm and 15 mm, in particular of between 0.5 mm and 10 mm, further in particular of between 1 mm and 5 mm. With this thickness, the fuel tank wall may provide an effective barrier between the liquid oxygen and the liquid fuel, while only contributing little mass to the overall weight of the rocket. The fuel tank wall may also comprise enforcing elements, such as stiffeners, stringers, isogrid features, etc. These enforcing elements may be included in above thickness values or may locally add thickness. The enforcing elements may be arranged on the inside of the fuel tank.

According to a further embodiment, the pressure within the fuel tank and within the oxygen tank may be between 1 bar and 30 bar in operation.

According to a further embodiment, the fuel tank has a generally cylindrical shape. In this way, the fuel tank has a shape that can be surrounded by the liquid oxygen tank in a regular manner. Also a generally cylindrical fuel tank can be conveniently slid into the inner space, provided by the oxygen tank wall, during manufacture.

According to a further embodiment, the oxygen tank has a generally hollow cylindrical shape. In other words, the space between a generally cylindrical fuel tank wall and a generally cylindrical oxygen tank wall may form a generally hollow cylinder, with this generally hollow cylinder forming the oxygen tank of the rocket propellant tank arrangement.

According to a further embodiment, the oxygen tank may have a diameter of between 0.5 m and 10 m, in particular of between 1 m and 5 m.

According to a further embodiment, the oxygen tank has an oxygen tank elongation and the fuel tank has a fuel tank elongation, wherein the oxygen tank elongation is between 80% and 120% of the fuel tank elongation, in particular between 90% and 110% of the fuel tank elongation. Further in particular, the oxygen tank elongation may be substantially equal to the fuel tank elongation. In other words, both the oxygen tank and the fuel tank may be lengthy structures, having respective longitudinal extensions each. The longitudinal extensions of the oxygen tank and the fuel tank may be comparable to each other or deviate by less than 20% from each other. In this way, a continuous arrangement of the oxygen tank around the fuel tank over most of the longitudinal extension or the entire longitudinal extension of the rocket propellant tank arrangement may be achieved. The direction of the longitudinal extension of the oxygen tank and the fuel tank may be the height direction of the rocket.

According to a further embodiment, the rocket propellant tank arrangement has a longitudinal extension of between 1 m and 50 m, in particular of between 3 m and 30 m, further in particular of between 5 m and 20 m.

According to a further embodiment, the fuel tank is substantially entirely enclosed by the oxygen tank. With the fuel tank being entirely or almost entirely enclosed by the oxygen tank, above described beneficial properties of a low pressure differential and a mutual cooling through the fuel tank wall may be made use of over the entire surface of the fuel tank wall.

According to a further embodiment, the oxygen tank is configured to store cryogenic liquid oxygen. Alternatively/in addition, the fuel tank is configured to store cryogenic liquid propane.

Further exemplary embodiments of the invention include a rocket propulsion unit, comprising a rocket propellant tank arrangement, as described with respect to any of the embodiments above, at least one combustion chamber, coupled to the rocket propellant tank arrangement for receiving liquid oxygen and liquid fuel, and at least one nozzle, coupled to the at least one combustion chamber, for ejecting exhaust gases from the at least one combustion chamber. The modifications, additional features, and effects, discussed above with respect to the rocket propellant tank arrangement, apply to the rocket propulsion unit in an analogous manner.

Exemplary embodiments of the invention further include a rocket, comprising at least one rocket propulsion unit, as described above, and a carrier structure for attaching one or more objects to be launched into space to the at least one rocket propulsion unit. The modifications, additional features, and effects, described above with respect to the rocket propellant tank arrangement, apply to the rocket in an analogous manner.

Exemplary embodiments of the invention further include a method of carrying propellant in a rocket, comprising carrying liquid oxygen in an oxygen tank, carrying liquid fuel in a fuel tank, with the fuel tank being at least partially arranged within the oxygen tank, and jointly controlling a liquid oxygen temperature of the liquid oxygen and a liquid fuel temperature of the liquid fuel. The modifications, additional features, and effects, described above with respect to the rocket propellant tank arrangement, apply to the method of carrying propellant in a rocket in an analogous manner. The liquid oxygen temperature and the liquid fuel temperature may be controlled jointly in a number of ways. For example, active cooling means may be provided that apply their cooling power jointly to the two tanks. It is also possible that the temperatures are controlled to be substantially the same or at least similar by selecting a particular fuel and a particular fuel pressure that yield a particular temperature matching the liquid oxygen temperature. By jointly controlling the liquid oxygen temperature and the liquid fuel temperature, the separation between the fuel tank and the oxygen tank may be implemented with low complexity, in particular implemented with little or no means for insulation.

Exemplary embodiments of the invention are described in detail below with respect to the accompanying drawings, wherein:

FIG. 1 shows a rocket propulsion unit in a schematic vertical cross-sectional view in accordance with a prior art approach;

FIG. 2 shows a rocket propulsion unit in a schematic vertical cross-sectional view in accordance with an exemplary embodiment of the invention;

Figure 3:
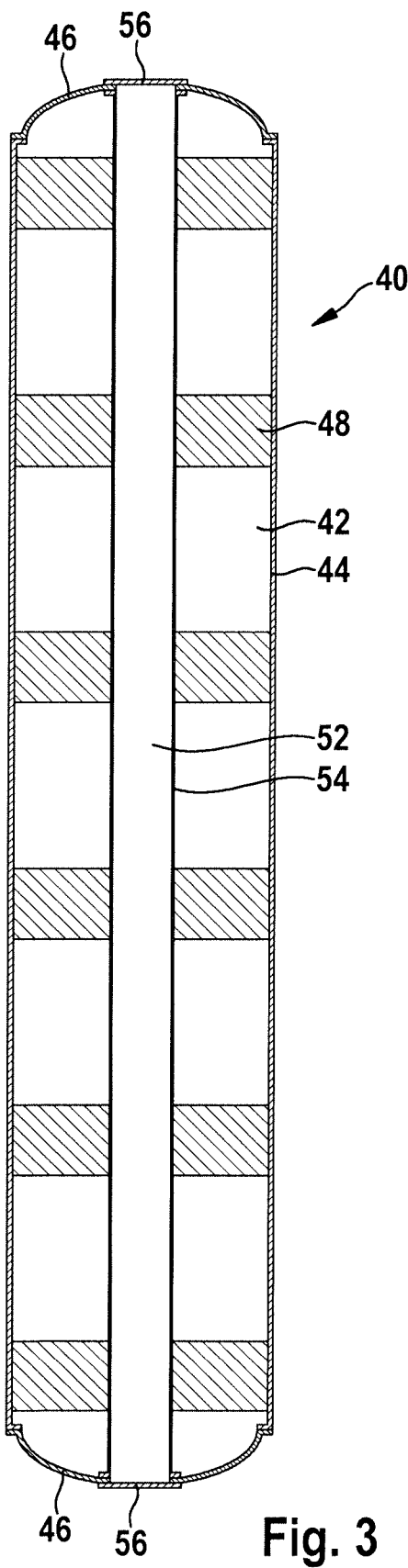
FIG. 3 shows a rocket propellant tank arrangement in a schematic vertical cross-sectional view in accordance with an exemplary embodiment of the invention.

FIG. 1 shows a rocket propulsion unit 2 in a schematic vertical cross-sectional view, with the rocket propulsion unit 2 being in accordance with a prior art approach. The rocket propulsion unit 2 has three basic components, namely a rocket propellant tank arrangement 4, a combustion chamber 6, and a nozzle 8 for ejecting the exhaust gases.

The rocket propellant tank arrangement 4 has an oxygen tank 10 for storing liquid oxygen, which is a commonly used oxidizer, and a fuel tank 12 for storing RP-1, which is a commonly used rocket fuel. The oxygen tank 10 and the fuel tank 12 are stacked one above the other in a load bearing tank 14. In particular, the fuel tank 12 is arranged above the oxygen tank 10, with an insulating intertank structure 16 being arranged therebetween. A fuel supply line 18 extends through the oxygen tank 10, such that both RP-1 and oxygen can be provided to the combustion chamber 6.

FIG. 2 shows a rocket propulsion unit 20 in a schematic vertical cross-sectional view, with the rocket propulsion unit 20 being in accordance with an exemplary embodiment of the invention. The rocket propulsion unit 20 has three basic components, namely a rocket propellant tank arrangement 40, a combustion chamber 60, and a nozzle 80.

The rocket propellant tank arrangement 40 of FIG. 2 has an oxygen tank 42 for storing liquid oxygen and a propane tank 52 for storing liquid propane. The propane tank 52 is a particular example of a fuel tank for storing liquid fuel. The rocket propellant tank arrangement 40 of FIG. 2 is configured to storing liquid propane. However, it is also possible to provide an analogous or similar rocket propellant tank arrangement for propene or propylene.

The propane tank 52 is arranged within the oxygen tank 42. In particular, the propane tank 52 has a generally cylindrical shape. The top and bottom ends of the propane tank have rounded propane tank caps for closing a generally cylindrical propane tank wall 54, thus forming the generally cylindrical shape of the propane tank 52. The oxygen tank 42 has a generally cylindrical oxygen tank wall 44, which forms the outer wall of the oxygen tank 42. Two rounded oxygen tank caps close the cylindrical structure to the top and to the bottom. The lower ends of the oxygen tank 42 and the propane tank 52, i.e. the ends of the oxygen tank 42 and the propane tank 52 towards the combustion chamber 60, are arranged at roughly the same height. In this way, both the oxygen supply line(s) and the propane supply line(s) to the combustion chamber 60 can be kept short.

The height extension of the oxygen tank 42, i.e. the longitudinal extension of the oxygen tank 42, is about 20% larger than the longitudinal extension of the propane tank 52. The oxygen tank 42 has the shape of a hollow cylinder along the length of the propane tank 52 and has a generally cylindrical shape thereabove. Liquid oxygen is stored all around the propane tank 52 with the exception of the very bottom thereof.

The diameter of oxygen tank wall is about three times the diameter of the propane tank wall. The propane tank wall is made of aluminium and has a thickness of about 1.5 mm in the exemplary embodiment of FIG. 2. The oxygen tank wall is also made of aluminium and has a thickness of about 10 mm in the exemplary embodiment of FIG. 2.

In FIG. 2, both the oxygen tank 42 and the propane tank 52 are shown in a partially filled state. The oxygen tank 42 is filled to about 90% with liquid oxygen. The propane tank 52 is filled to about 90% with liquid propane.

As compared to the rocket propellant tank arrangement 4 of FIG. 1, the rocket propellant tank arrangement 40 of FIG. 2 does not require an insulating intertank structure 16. Also, with the propane tank 52 being arranged within the oxygen tank 42, only two large end caps on the top and the bottom of the rocket propellant tank arrangement 40 are required instead of the four large end caps of the two tanks of the rocket propellant tank arrangement 4. Also, the design of the fuel supply line is greatly simplified, eliminating the need for the long range fuel supply line 18 of the rocket propellant tank arrangement 4 of FIG. 1. Also, the propane tank wall 54 is greatly reduced in thickness as compared to the wall of the fuel tank 12. Further, the propane and oxygen can be jointly cooled and their temperature jointly controlled in the rocket propellant tank arrangement 40 of FIG. 2, as compared to the separated systems of the rocket propellant tank arrangement 4 of FIG. 1.

FIG. 3 shows a rocket propellant tank arrangement 40 in a schematic vertical cross-sectional view, with the rocket propellant tank arrangement 40 being in accordance with an exemplary embodiment of the invention. The rocket propellant tank arrangement 40 has an oxygen tank 42 and a propane tank 52. The propane tank 52 is formed by a propane tank wall 54, which is cylindrical in shape. Accordingly, the propane tank 52 as a whole has a generally cylindrical shape as well. The top and bottom ends of the propane tank 52 are closed with propane tank caps 56, which are generally disk-shaped. Again, the propane tank 52 is an exemplary embodiment of a fuel tank. It is also possible that a propene tank or a propylene tank is provided instead of the propane tank 52.

The propane tank 52 is arranged within the oxygen tank 42. In particular, the oxygen tank 42 is formed between the generally cylindrical propane tank wall 54 and a generally cylindrical oxygen tank wall 44. The generally cylindrical propane tank wall 54 and the generally cylindrical oxygen tank wall 44 are arranged in a concentric manner, i.e. they are arranged with their respective center axes coinciding. The generally cylindrical oxygen tank wall 44 has a somewhat smaller height extension than the generally cylindrical oxygen tank wall 54. The oxygen tank 42 is closed at its top and bottom ends by rounded oxygen tank caps 46. The oxygen tank caps 46 are annular, thus closing the oxygen tank 42 of generally hollow cylindrical shape. Due to their rounded three-dimensional shape, the oxygen tank caps 46 make sure that the propane tank 52 and the oxygen tank 42 have the same height extension at the contact points of the oxygen tank caps 46 and the propane tank caps 56 in the exemplary embodiment of FIG. 3.

As liquid oxygen is stored all around the propane tank wall 54, the propane tank 52 is considered to be fully arranged within the oxygen tank 42.

In the exemplary embodiment of FIG. 3, the diameter of the oxygen tank wall 44 is about four times the diameter of the propane tank wall 54. Depending on the relative height extensions of the propane tank 52 and the oxygen tank 42 as well as on the desired mixing ratio for combustion, other relative diameters may be used. Also, the propane tank 52 and the oxygen tank 42 may have other geometric shapes. For example, the propane tank 52 may be of generally ellipsoidal shape, being arranged in an oxygen tank 42 with a generally cylindrical oxygen tank wall 44 or with an ellipsoidal oxygen tank wall.

The rocket propellant tank arrangement 40 of FIG. 3 further comprises a plurality of propane tank fixation elements 48. The propane tank fixation elements 48 are provided for ensuring a spatial fixation between the propane tank wall 54 and the oxygen tank wall 44 along the length of the rocket propellant tank arrangement 40. The propane tank fixation elements 48 may be attached to the propane tank wall 54 or to the oxygen tank wall 44 or to both the propane tank wall 54 and the oxygen tank wall 44 in a suitable manner. While the attachment to one of the propane tank wall 54 and the oxygen tank wall 44 may be sufficient for ensuring a spatial fixation, an attachment to both of the propane tank wall 54 and the oxygen tank wall 44 may allow for a more robust overall rocket propellant tank arrangement 40.

In the exemplary embodiment of FIG. 3, the propane tank fixation elements 48 are embodied as sheet-like elements, also referred to as fixation fins. Further, the propane tank fixation elements 48 act as slosh baffles in the exemplary embodiment of FIG. 3, preventing an excessive motion of the liquid oxygen stored in the oxygen tank 42 during operation.

Figure 4:
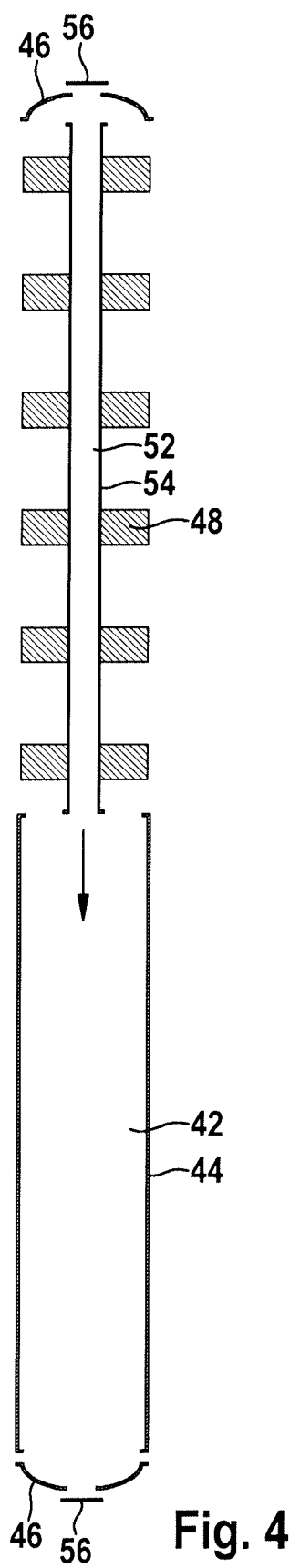
FIG. 4 shows the rocket propellant tank arrangement of FIG. 3 in a pre-assembled state.

FIG. 4 shows the rocket propellant tank arrangement 40 of FIG. 3 in a pre-assembled view. In particular, FIG. 4 shows that the propane tank fixation elements 48 are attached to the propane tank wall 54 and that the pre-assembled unit of propane tank wall 54 and propane tank fixation elements 48 is slid into the oxygen tank wall 44 during assembly, as indicated by the arrow in FIG. 4. This combination of oxygen tank wall 44, propane tank wall 54, and propane tank fixation elements 48 is then closed via the assembly of the propane tank caps 56 and the oxygen tank caps 46. Liquid propane and liquid oxygen may be filled into the propane tank 52 and the oxygen tank 42, respectively, before the second set of an oxygen tank cap 46 and a propane tank cap 56 are attached. Alternatively, at least one of each of the oxygen tank caps 46 and the propane tank caps 56 may have a suitable opening for introducing the liquid oxygen and the liquid propane therethrough.

Figure 5:
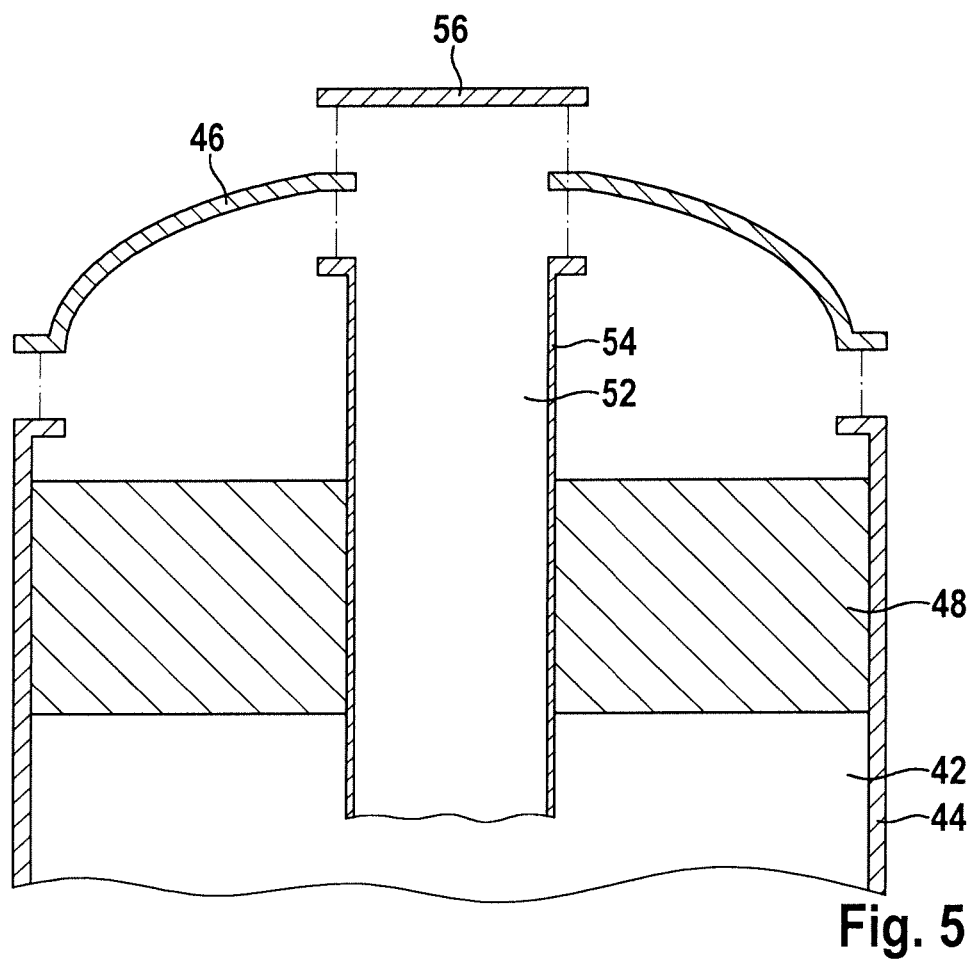
FIG. 5 shows the upper end portion of the rocket propellant tank arrangement of FIG. 3 in greater detail.

FIG. 5 shows the top section of the rocket propellant tank arrangement 40 of FIG. 3 in more detail. In particular, it is shown that the oxygen tank wall 44, the propane tank wall 54, and the oxygen tank caps 46 have respective flanges. With the help of these flanges, the oxygen tank 42 and the propane tank 52 are closed with the oxygen tank caps 46 and the propane tank caps 56 via suitable fastening means.

Figure 6:
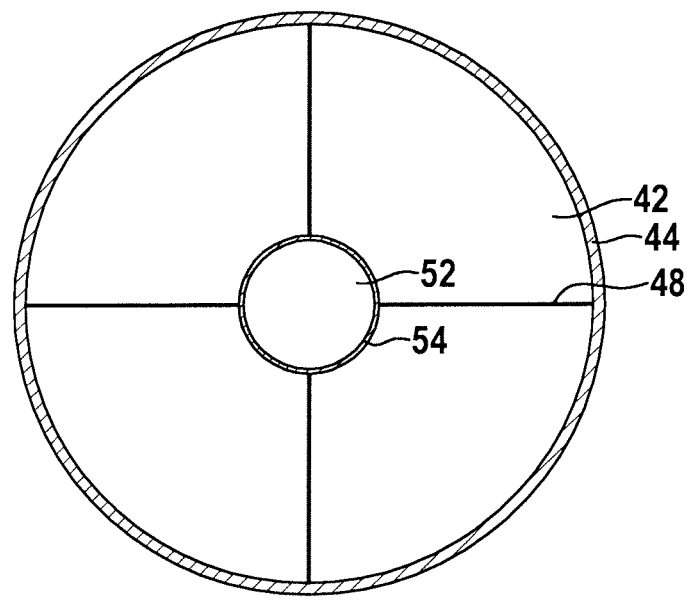
FIG. 6 shows the rocket propellant tank arrangement of FIG. 3 in a schematic horizontal cross-sectional view.

FIG. 6 shows a schematic horizontal cross-sectional view through the rocket propellant tank arrangement 40 of FIG. 3. FIG. 6 illustrates that the propane tank 52 has a generally circular horizontal cross-section and that the oxygen tank 42 has a generally annular horizontal cross-section. Accordingly, FIG. 6 also shows that both the oxygen tank wall 44 and the propane tank wall 54 have a circular cross-section, with the two circles being arranged concentrically. In the cross-section depicted in FIG. 6, four propane tank fixation elements 48 are depicted. With these four propane tank fixation elements 48, the propane tank 52 is spatially fixed in two dimensions with respect to the oxygen tank wall 44. It is also illustrated that the propane tank fixation elements 48 are sheet-like structures having a thin horizontal cross-section.

Figure 7:
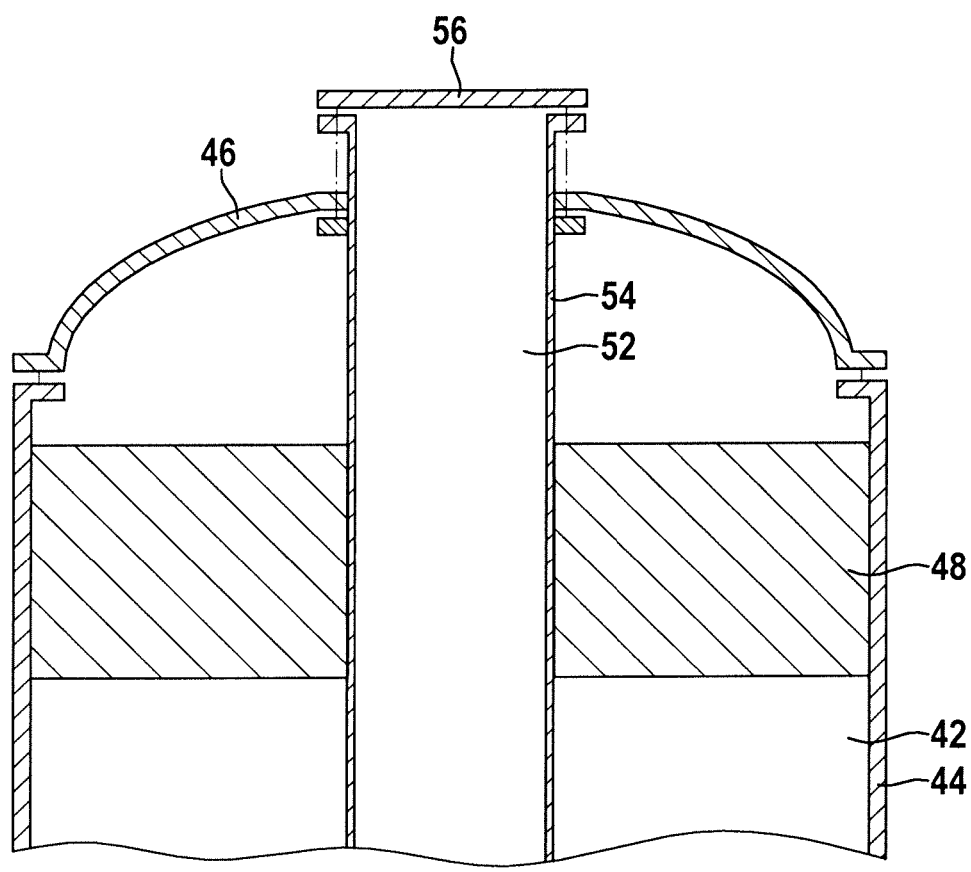
FIG. 7 shows a rocket propellant tank arrangement in a schematic vertical cross-sectional view in accordance with another exemplary embodiment of the invention.

FIG. 7 shows a rocket propellant tank arrangement 40 in a schematic vertical cross-sectional view, with the rocket propellant tank arrangement 40 being in accordance with another exemplary embodiment of the invention. In particular, the rocket propellant tank arrangement 40 corresponds to the rocket propellant tank arrangement 40 of FIGS. 3 to 6, with the exception of the relative longitudinal extensions of the propane tank 52 and the oxygen tank 42 and the closing mechanism. In particular, in FIG. 7, the propane tank 52 has a greater height extension than the oxygen tank 42. The propane tank 52 extends beyond the oxygen tank 42 at the upper end. Such an arrangement may be chosen for providing easier access to the propane tank 52 for fueling. In the exemplary embodiment of FIG. 7, the oxygen tank cap 46 is fastened to a flange that is spaced from the upper end of the propane tank 52.

Figure 8:
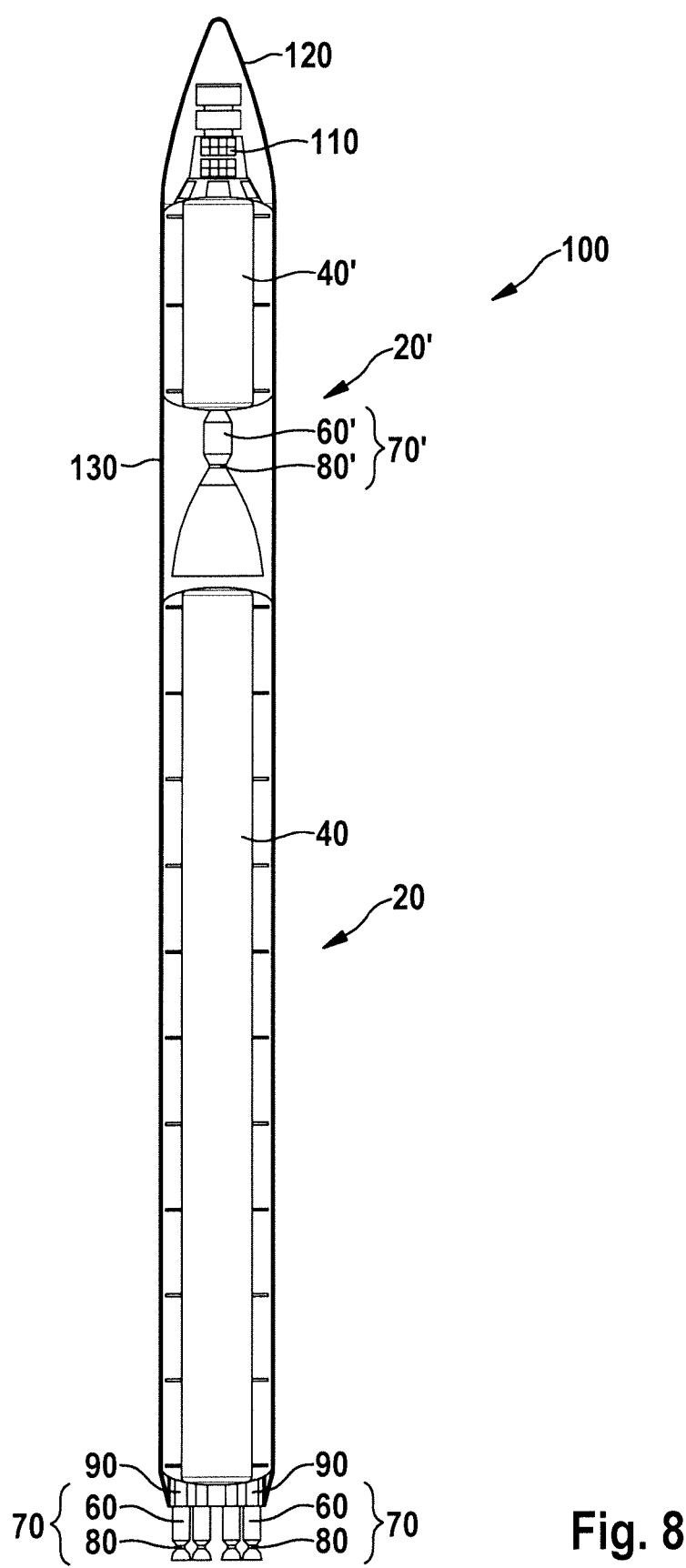
FIG. 8 shows a rocket in a schematic view in accordance with an exemplary embodiment of the invention.

FIG. 8 shows a rocket 100 in a schematic view, with the rocket 100 being in accordance with an exemplary embodiment of the invention. The rocket 100 comprises two rocket propulsion units 20, 20', namely a first stage rocket propulsion unit 20 and a second stage rocket propulsion unit 20'. The rocket 100 further comprises a payload 110, such as a satellite to be carried into space, covered by a deployable aerodynamic fairing 120.

The first stage rocket propulsion unit 20 has a first rocket propellant tank arrangement 40, which may be in accordance with any of the embodiments described above. The first stage rocket propulsion unit 20 further has four first stage engines 70, each having a first stage combustion chamber 60 and a first stage nozzle 80, and four turbo pumps 90. The turbo pumps 90 ensure that the fuel is provided to the combustion chambers 60 at suitable pressures. The pressure within the fuel tank of the first stage rocket propulsion unit 20 may be between 1 bar and 10 bar. The provision of turbo pumps allows for storing the fuel at moderate pressures, thus again lowering the structural mass of the fuel tank.

The second stage rocket propulsion unit 20' has a second rocket propellant tank arrangement 40', which may also be in accordance with any of the embodiment described above. The second stage rocket propulsion unit 20' further has a second stage engine 70', which has a second stage combustion chamber 60' and a second stage nozzle 80'. The second stage engine 70' is surrounded by a deployable aerodynamic cover 130. The pressure within the fuel tank of the second stage rocket propulsion unit 20' may be between 10 bar and 30 bar.

The operation of the rocket 100 may be as follows. For take-off and the first flight phase, the first stage rocket propulsion unit 20 is used, with the fuel and oxygen of the first rocket propellant tank arrangement 40 being used in the first flight phase. After using up the fuel and oxygen stored in the first rocket propellant tank arrangement 40, the first stage rocket propulsion unit 20 is discarded, i.e. de-coupled from the remainder of the rocket 100. The second stage rocket propulsion unit 20' is then used for the second flight phase. After the second flight phase, the second stage rocket propulsion unit 20' is discarded, i.e. de-coupled from the payload 110. With the deployable aerodynamic fairing 120 also being discarded, the payload is then, by itself, maneuvered to its target position, such as to a desired orbit in case of the payload 110 being a satellite.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A method of carrying propellant in a rocket and of supplying propellant to an engine of the rocket, comprising:
carrying liquid oxygen in an oxygen tank;
carrying liquid fuel in a fuel tank, with the fuel tank having a fuel tank wall, with the fuel tank being at least partially arranged within the oxygen tank and with the liquid fuel being one of liquid propane, liquid propene, and liquid propylene, wherein an inner surface of the fuel tank wall is in fluid communication with the fuel in the fuel tank and an outer surface of the fuel tank wall is in fluid communication with the oxygen in the oxygen tank;
wherein the fuel tank has a generally cylindrical shape, with the fuel tank wall being generally cylindrical, and wherein the oxygen tank has a generally hollow cylindrical shape, formed between the generally cylindrical fuel tank wall and a generally cylindrical oxygen tank wall, and wherein the fuel tank comprises generally disk-shaped fuel tank caps at its top and bottom ends and wherein the oxygen tank comprises annular oxygen tank caps at its top and bottom ends;
jointly controlling a liquid oxygen temperature of the liquid oxygen and a liquid fuel temperature of the liquid fuel, with the fuel tank wall allowing for mutual cooling of the liquid oxygen and the liquid fuel; and
supplying the liquid oxygen and the liquid fuel via short range supply lines from a lower portion of the oxygen tank and a lower portion of the fuel tank to the engine, which is arranged below the oxygen tank and the fuel tank.

2. The method of claim 1, wherein a plurality of fuel tank fixation elements are arranged between the fuel tank wall and the oxygen tank wall.

3. The method of claim 2, wherein the plurality of fuel tank fixation elements are a plurality of fixation fins.

4. The method of claim 1, wherein the fuel tank wall is made of aluminum, steel, carbon fiber based composites or composite overwrap aluminum.

5. The method of claim 1, wherein the fuel tank wall is made of austenitic stainless steel.

6. The method of claim 1, wherein the fuel tank wall has a thickness of 0.1 mm to 15 mm.

7. The method of claim 1, wherein the fuel tank wall has a thickness of 0.5 mm to 10 mm.

8. The method of claim 1, wherein the fuel tank wall has a thickness of 1 mm to 5 mm.

9. The method of claim 1, wherein the fuel tank wall is free of insulating material.

10. The method of claim 1, wherein the oxygen tank has an oxygen tank elongation, the fuel tank has a fuel tank elongation, and the oxygen tank elongation is between 80% and 120% of the fuel tank elongation.

11. The method of claim 1, wherein the oxygen tank has an oxygen tank elongation, the fuel tank has a fuel tank elongation, and the oxygen tank elongation is between 90% and 110% of the fuel tank elongation.

12. The method of claim 1, wherein the fuel tank is substantially entirely enclosed by the oxygen tank.

13. The method of claim 1, wherein the oxygen tank is configured to store cryogenic liquid oxygen and the fuel tank is configured to store cryogenic liquid propane.

14. The method of claim 1, wherein the oxygen tank is configured to store cryogenic liquid oxygen or the fuel tank is configured to store cryogenic liquid propane.

15. The method of claim 1, further comprising:
receiving the liquid oxygen and the liquid fuel at a combustion chamber of the engine; and
ejecting exhaust gases from the combustion chamber via a nozzle, coupled to the combustion chamber.

* * * * *